(12) United States Patent
Villano et al.

(10) Patent No.: US 8,393,665 B2
(45) Date of Patent: Mar. 12, 2013

(54) PICK-UP TRUCK BED TOOL BOX SYSTEM

(76) Inventors: Kenneth J. Villano, Cherry Hill, NJ (US); John M. Morris, Shamong, NJ (US)

(*) Notice: Subject to any disclaimer, the term of this patent is extended or adjusted under 35 U.S.C. 154(b) by 112 days.

(21) Appl. No.: 12/931,558

(22) Filed: Feb. 3, 2011

(65) Prior Publication Data

US 2012/0200106 A1    Aug. 9, 2012

(51) Int. Cl.
*B60R 9/042* (2006.01)

(52) U.S. Cl. ...... 296/37.6; 296/37.1; 224/403; 224/543; 414/462

(58) Field of Classification Search ............ 296/7, 37.1, 296/37.6; 224/402, 403, 542, 543; 414/462, 414/463, 466, 522, 539, 540, 541

See application file for complete search history.

(56) References Cited

U.S. PATENT DOCUMENTS

| | | | | |
|---|---|---|---|---|
| 4,830,421 A | * | 5/1989 | Hawelka et al. | 296/24.45 |
| 6,626,479 B1 | * | 9/2003 | Skoug | 296/37.6 |
| 7,182,177 B1 | * | 2/2007 | Simnacher | 187/211 |

* cited by examiner

*Primary Examiner* — Glenn Dayoan
*Assistant Examiner* — Jason S Daniels
(74) *Attorney, Agent, or Firm* — Stuart M. Goldstein

(57) ABSTRACT

A pick-up truck bed toolbox system utilizes a tool storage box which, in its stored, stationary position, rests on the floor of the bed of a pick-up truck such that it is parallel to the side wall of the truck. Electric motors, which can be remotely operated, are utilized to rotate dual, upstanding screw shafts which are connected via laterally extending cantilever arm members to the front and rear ends of the toolbox. The screw shafts raise the toolbox from its resting position on the floor of the bed of the pick-up truck, to an elevated position over the floor, and the shafts then operate to move the arm members laterally to extend the tool box to a position passed the side wall. The screw shafts can then be activated to lower the tool box to a lowered position outside the truck, adjacent to and alongside the sidewall, thus providing easy and ready access to the toolbox. The same system is utilized to return the toolbox from this lowered position outside the truck, to the floor of the truck bed.

3 Claims, 6 Drawing Sheets

PICK-UP TRUCK BED TOOL BOX SYSTEM

FIELD OF THE INVENTION

The present invention relates to toolboxes for the beds of pick-up trucks and, more particularly, to a motorized system for shifting a toolbox from the bed of a pick-up truck, to a position alongside the truck for ready access to the toolbox.

BACKGROUND OF THE INVENTION

It is common to position toolboxes, material and supplies, tool cabinets, and various other storage containers on the bed or on sidewalls of pick-up trucks, utility trailers or similar vehicles. While most such containers are immoveably fixed to the bed of a pick-up truck, there have been a number of proposed systems which move the toolbox within or out of the truck's bed. These proposed systems include mechanisms which slide or roll toolboxes to various locations within or out of the tool bed, support brackets to allow toolboxes to swing out of the bed, and devices which pivot toolboxes from positions within the bed. However, most of these systems, and others which have been suggested, are not generally incorporated into pick-up truck beds. There are a variety of reasons for this. For instance, prior systems which have been proposed have never been reduced to actual practice since they do not work effectively or efficiently. Many systems are subject to breakage with attendant costs of repair and others have components which are just too expensive to be economically practical.

SUMMARY OF THE INVENTION

It is the object of the present invention to provide a pick-up truck bed tool box system which overcomes the disadvantages and limitations of existing systems.

It is the object of the present invention to provide a pick-up truck bed tool box system which is easily and smoothly moveable between a stationary stored position on the floor of the bed of a pick-up truck to a position outside the truck, adjacent to its sidewall, to allow ready access to the toolbox.

It is another object of the present invention to provide a pick-up truck bed tool box system which is efficiently and economical to manufacture and install on a pick-up truck.

It is still another object of the present invention to provide a pick-up truck bed tool box system which is durable and reliable for providing prolonged operation and use.

These and other objects are accomplished by the prevent invention, a pick-up truck bed toolbox system comprising a tool storage box which, in its stored, stationary position, rests on the floor of the bed of a pick-up truck such that it is parallel to the side wall of the truck. Electric motors, which can be remotely operated, are utilized to rotate dual, upstanding screw shafts which are connected via laterally extending cantilever arm members to the front and rear ends of the toolbox. The screw shafts raise the toolbox from its resting position on the floor of the bed of the pick-up truck, to an elevated position over the floor, and the shafts then operate to move the arm members laterally to extend the tool box to a position passed the side wall. The screw shafts can then be activated to lower the tool box to a lowered position outside the truck, adjacent to and alongside the sidewall, thus providing easy and ready access to the toolbox. The same system is utilized to return the toolbox from this lowered position outside the truck, to the floor of the truck bed.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
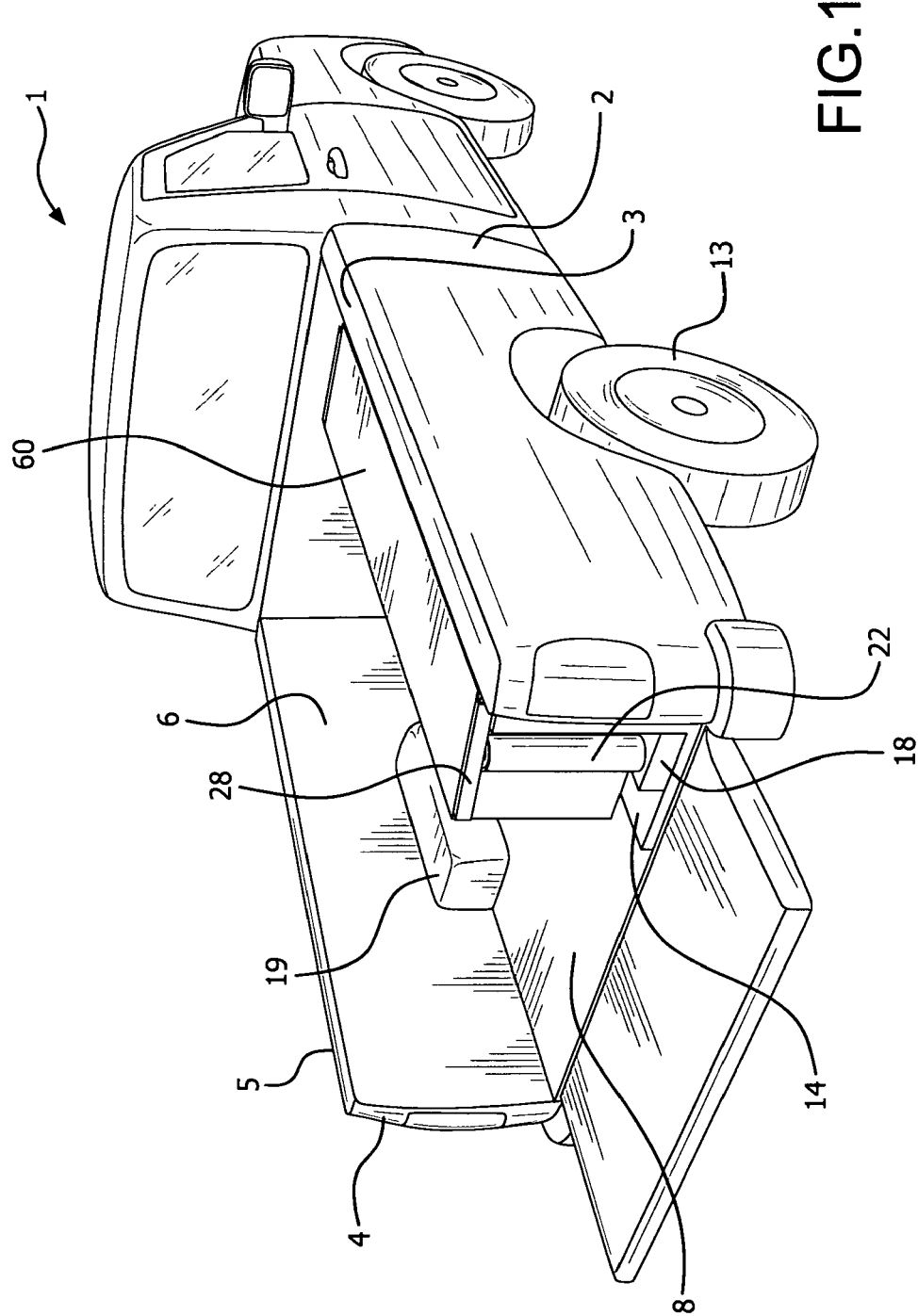
FIG. 1 is a perspective right side rear view of a pick-up truck in which is incorporated the pick-up truck bed toolbox system of the present invention, showing the tool box in its rested position with the truck bed.

Pick-up truck 1 has longitudinal axis 100 and comprises sidewall 2 with top surface 3, sidewall 4 with top surface 5, and truck bed 6 having floor 8. Tire 13 extends into wheel well 15 and tire 17 extends into wheel well 19 of truck 1. Tool storage box 60 normally rests on or adjacent to truck floor 8 of truck bed 6; and, in this position, cutout opening 62 into the tool box accommodates wheel well 15.

Figure 6:
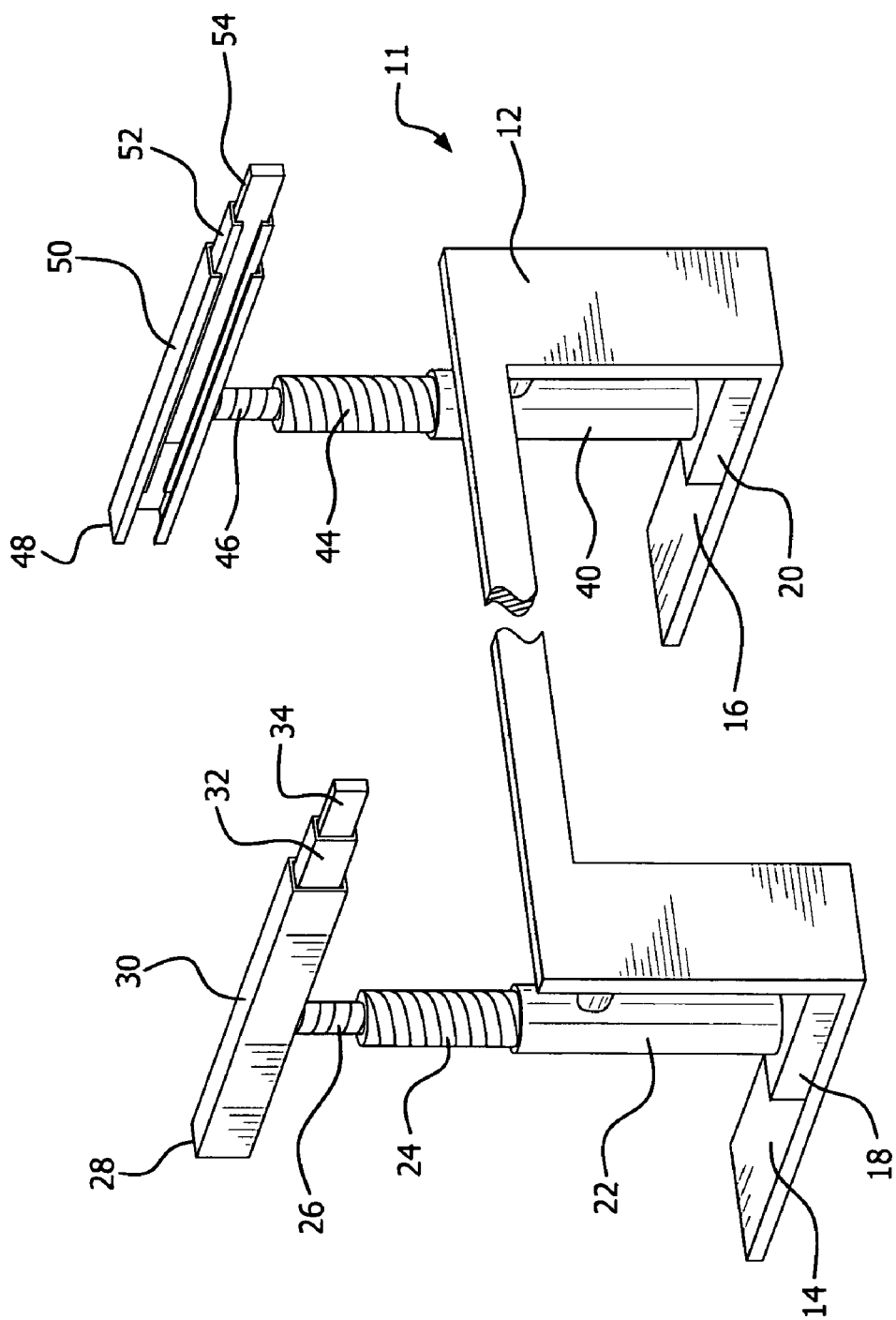
FIG. 6 is a perspective view of the mounting unit and screw shaft assemblies of the pick-up truck bed toolbox system of the present invention.

Tool floor box system mounting unit 11, shown in detail in FIG. 6, comprises front section 12 and support pads 14 and 16, which are rigidly, screwed, bolted, welded or otherwise secured to floor 8. Mounting unit 11 is also secured to the inside surface of side wall 2. Motors 18 and 20, preferably electric, are secured in position on pads 14 and 16.

Vertical screw shaft casings 22 and 40 extend up from pads 14 and 16 respectively. Dual screw shafts 24 and 26 are rotatably housed within shaft casing 22, shaft 26 being connected through tool box lateral adjustment support assembly 28. Support assembly 28 comprises main support member 30, first cantilevered arm 32 telescopically slideable within the support member, and second cantilevered arm 34 telescopically slideable within arm 32. Arm 34 is attached to the aft end of tool box 60 and secures support assembly 28 to the tool box. Shaft 26 is linked to arms 32 and 34 through appropriate gearing, known in the art, to slideably extend the arms laterally, upon rotation of the shaft.

Similarly dual screw shafts 44 and 46 are rotatably housed within shaft casing 40, shaft 46 being connected through tool box lateral adjustment support assembly 48. Support assembly 48 comprises main support member 50, first cantilevered arm 52 telescopically slideable within the support member, and second cantilevered arm 54 telescopically slideable within arm 52. Arm 34 is attached to the forward end of tool box 60 and secures support assembly 48 to the tool box. Like shaft/arm connection of tool assembly 28, shaft 46 is linked to arms 52 and 54 through appropriate, gearing known in the art, to slideably extend the arms laterally, upon rotation of the shaft.

Figure 2:
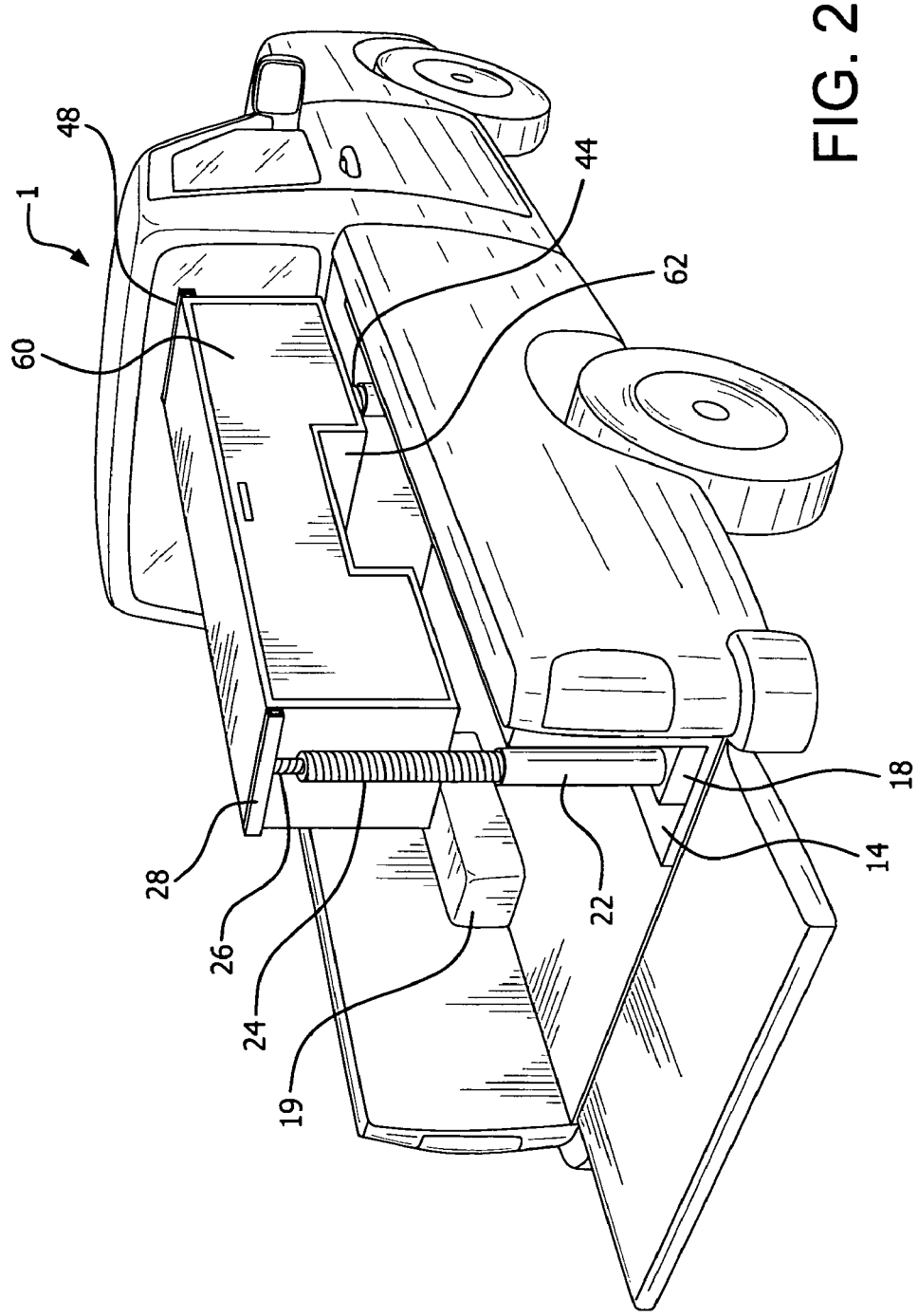
FIG. 2 is a perspective right side rear view of a pick-up truck in which is incorporated the pick-up truck bed toolbox system of the present invention, showing the tool box in its elevated position over the truck bed floor.
Figure 3:
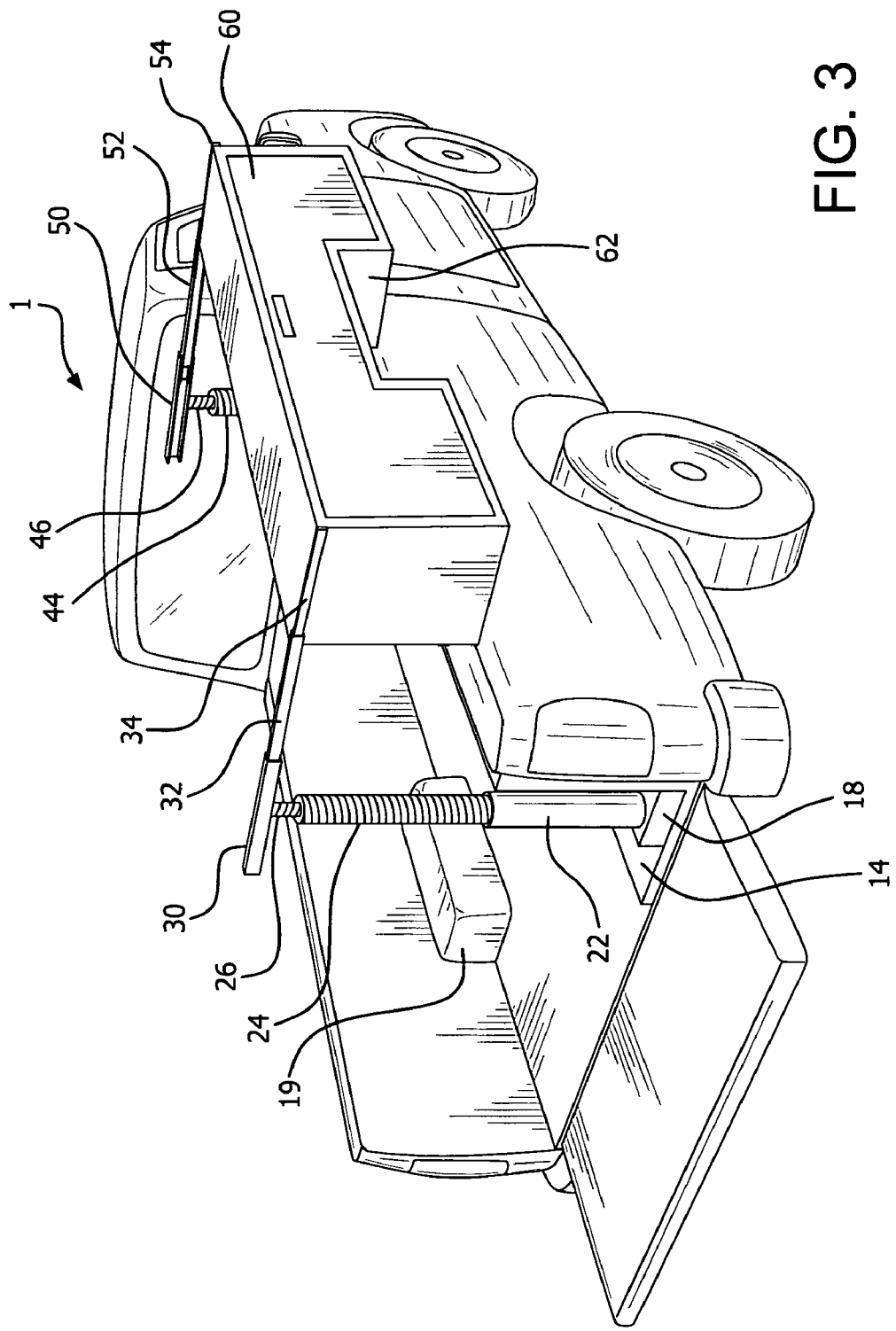
FIG. 3 is a perspective right side rear view of a pick-up truck in which is incorporated the pick-up truck bed toolbox system of the present invention, showing the tool box in its elevated position over the truck bed floor and passed the side wall of the truck.
Figure 4:
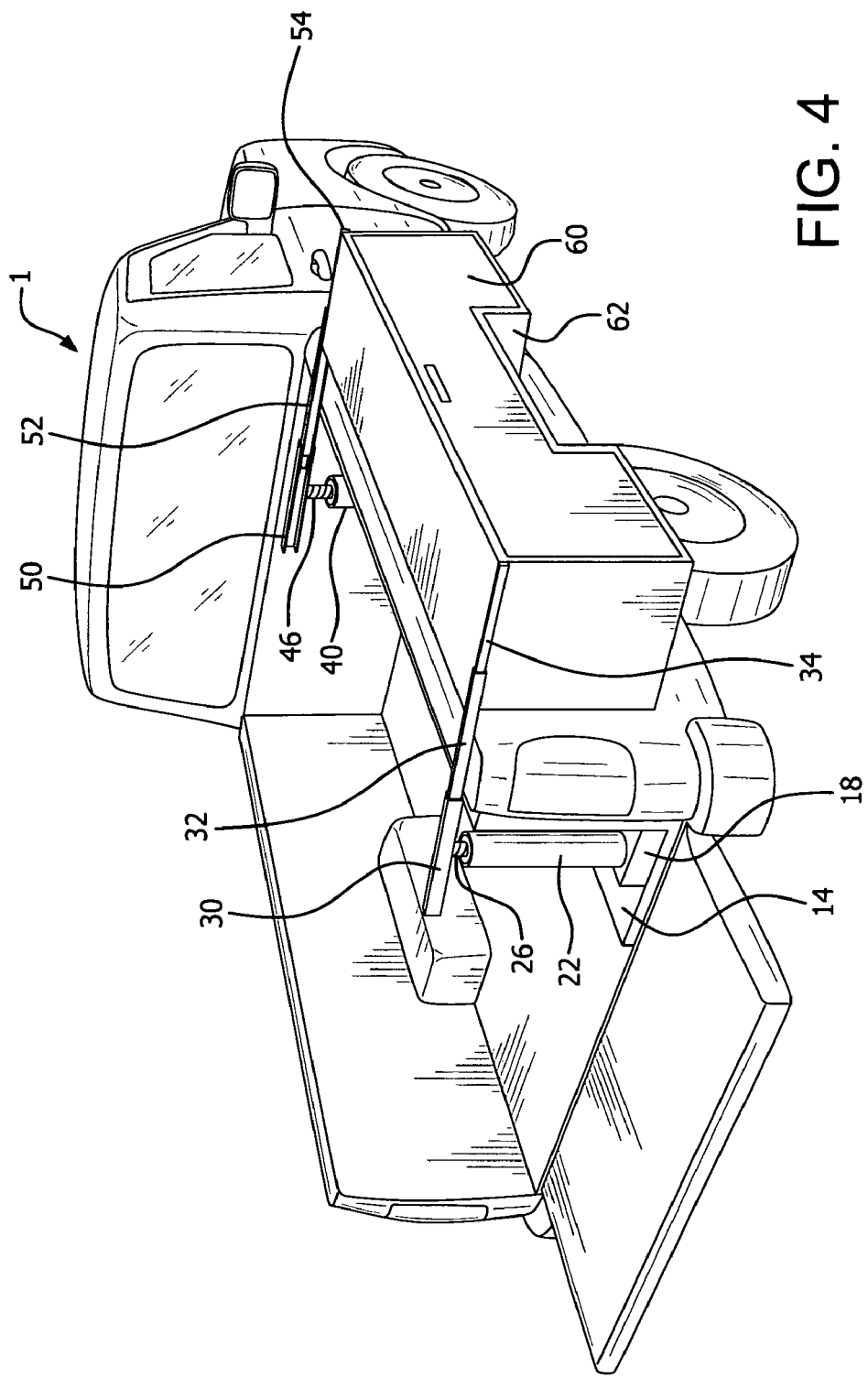
FIG. 4 is a perspective right side rear view of a pick-up truck in which is incorporated the pick-up truck bed toolbox system of the present invention, showing the tool box in its lowered position alongside the outside of the truck.
Figure 5:
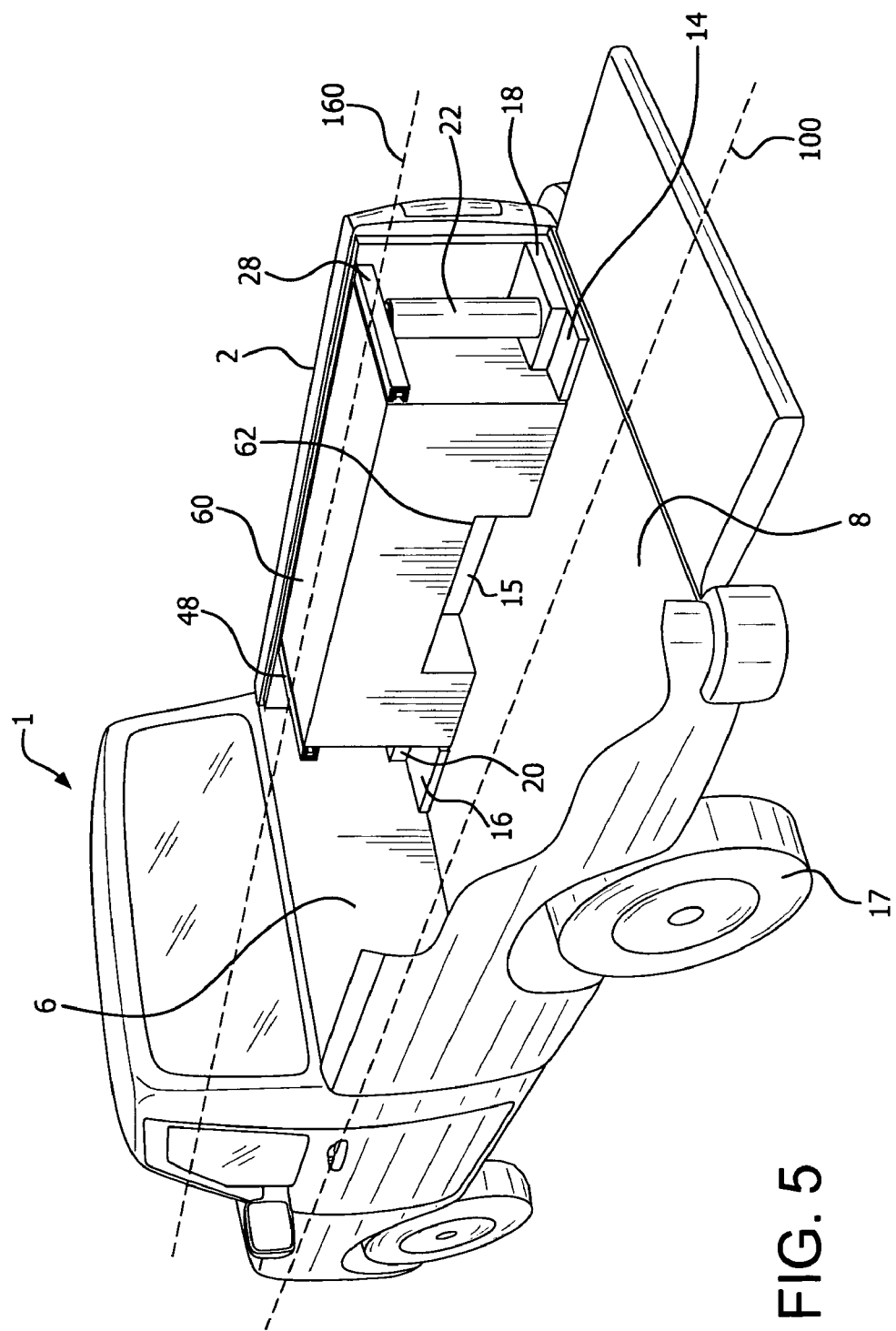
FIG. 5 is a perspective left side rear view of a pick-up truck in which is incorporated the pick-up truck bed tool box system of the present invention.

Operation of the pick-up truck tool system is as follows. As previously discussed, when not in use, tool box 60 rests on or is adjacent to truck floor 8 of truck bed 6. See FIGS. 1 and 5. In this resting position, longitudinal axis 160 of tool box 60 is parallel to longitudinal axis 100 of truck 1. Actuation signals are sent to motors 18 and 20, either by a remote control unit or from the cab of truck 1. Motors 18 and 20 are thereby turned on and provide the power to rotate shafts 24 and 44, to vertically raise tool box 60 above truck bed 6 to a height above the height of side wall 2, see FIG. 2, and then to rotate shafts 26 and 46 to laterally extend arms 32, 34 and 52 and 54, thereby shifting the tool box sideways, to a position over and passed sidewall 2. See FIG. 3. A second signal is sent to motors 18 and 20 for the rotation of shafts 24 and 44 to then lower tool box 60 to its lowered, use position, adjacent to and alongside the outside of sidewall 2. See FIG. 4. Appropriate signals are sent to rotate shafts 24, 26, 44 and 46 in reverse, in order to return tool box 60 from its lowered position outside sidewall 2, to its resting position within truck bed 6.

It is significant that longitudinal axis 160 of tool box 60 is, at all times and in all positions, e.g. resting, raised, extended, and lowered, parallel to longitudinal axis 100 of truck 1.

It is contemplated that actuation of motors 18 and 20 to move tool box 60 will be controlled either from inside the cab of truck 1 or by a remote control unit. In both cases, there will be push button or equivalent actuating mechanisms to raise tool box 60 from its resting position to the positions over sidewall 2 and to its lowered position, and to reverse the movement of tool box 60 to return it to its resting position with truck bed 6.

Truck 1 should only be configured to be driven when tool box 60 is either in its resting position. The truck should not be operable when tool box 60 is in its raised position or its lowered position, outside the truck, for obvious safety considerations. As a result, it is anticipated that an appropriate electrical system will be in place which prevents the engine of the truck from starting when tool box 60 is in its lowered position.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A pick-up truck tool box system comprising:
a pick-up truck having a longitudinal axis extending the length of the truck, a truck bed comprising a floor, and at least one upstanding side wall;
a tool storage box having a front end and a rear end and a longitudinal axis extending the length of the box, said box being moveable between a resting position adjacent to the floor of the truck bed, to a raised position elevated over the truck bed, to an extended position laterally passed the sidewall, to a lowered position adjacent to and alongside the outside of the side wall;
height adjustment means for raising the tool box above the bed floor from the resting position to the raised position, for lowering the box from the extended position to the lowered position, and, at all times while the tool box is in its resting position and at all times during said raising and lowering, maintaining the longitudinal axis of the truck and the longitudinal axis of the tool box parallel to each other, said height adjustment means comprising a first vertical shaft extending upward from the floor of the truck bed and located in spaced relation to the front end of the tool box and a second vertical shaft extending upward from the floor of the truck bed and located in spaced relation to the rear end of the tool box;
lateral adjustment means for shifting the tool box sideways from the raised position to the extended position passed the side wall, and, at all times while shifting, for maintaining the longitudinal axis of the truck and the longitudinal axis of the tool box parallel to each other, said lateral adjustment means comprising a third vertical shaft extending from the first shaft and a fourth vertical shaft extending from the second shaft;
cantilevered arm members connected to the front and rear ends of the tool box, the arm members extending from the third and fourth shafts; and
power means for driving the shafts, whereby upon actuation of the power means the tool box is raised above the bed floor from the resting position to the raised position, from the raised position to the extended position, and from the extended position to the lowered position.

2. The pick-up truck tool box system as in claim 1 wherein the cantilevered arm members are slideably moveable within cantilevered arms.

3. The pick-up truck tool box system as in claim 2 wherein the cantilevered arm members are connected to the tool box and the cantilevered arms are connected to the third and fourth screw shafts.

\* \* \* \* \*